Aug. 23, 1960 E. V. GORE 2,949,950
NUT CRACKER
Filed Feb. 11, 1959

INVENTOR.
ETHEL V. GORE.
BY Joseph O. Lindecker

United States Patent Office 2,949,950
Patented Aug. 23, 1960

2,949,950
NUT CRACKER
Ethel V. Gore, 112 S. Leon Ave., De Land, Fla.
Filed Feb. 11, 1959, Ser. No. 792,574
1 Claim. (Cl. 146—13)

This invention relates to nut crackers and more particularly to a novelty nut cracker.

It is an object of the present invention to provide a manually operated nut cracker which simulates the outline of a dog and in which actuation of the simulated tail thereof is operative to crush nuts between the simulated jaws thereof.

Another object of the present invention is to provide a novelty nut cracker of the above type that can be conveniently supported upon a table so that both hands may be used to manipulate the simulated tail and to hold the nut in operative engagement between the simulated jaws during the operation thereof.

Other objects of the invention are to provide a nut cracker bearing the above objects in mind which is of simple construction, has a minimum number of parts, is inexpensive to manufacture and efficient in operation.

Figure 1:
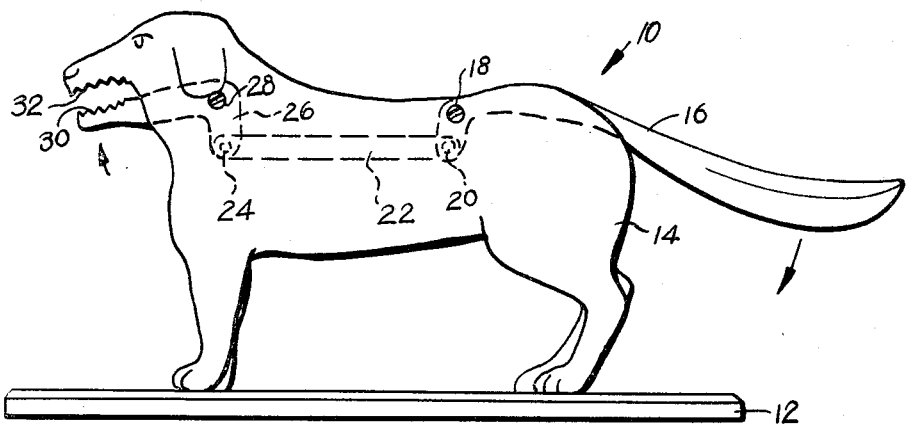
Figure 2:
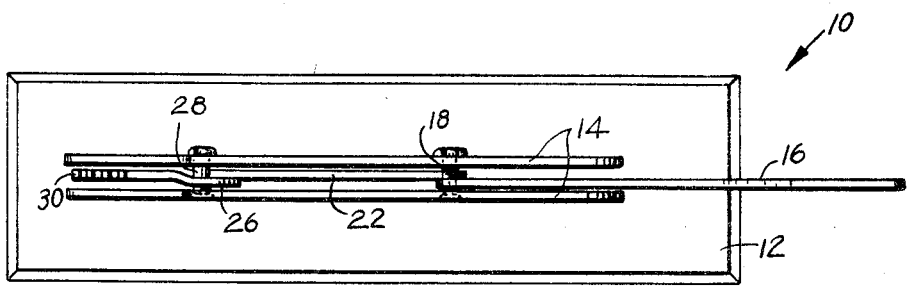

For other objects and for a better understanding of the invention, reference may be had to the following detailed description taken in conjunction with the accompanying drawing, in which:

Figure 1 is a side elevational view of a nut cracker made in accordance with the present invention; and Figure 2 is a top plan view of the assembly shown in Figure 1.

Referring now more in detail to the drawing, a nut cracker 10 made in accordance with the present invention is shown to include a heavy rigid base 12 having a pair of substantially identical upright plates 14 integrally secured thereto, each such plate spaced from each other and conforming generally to the outline of a dog.

A first bell crank lever 16 arranged in an off-set vertical plane having a simulated tail at one end and a depending portion at the opposite end is pivotally mounted between the plates 14 upon a transverse pivot pin 18. Another bell crank 26 pivotally supported by means of a pivot pin 28 between the opposite end of the plates 14 has the simulated lower jaw of the dog 30 at one end and a horizontally offset and depending portion 26 at the opposite end. This end of the plates 14 is also provided with a fixed downwardly facing jaw 32 with two longitudinal series of teeth which is in a straight vertical plane and is stationary relative to the movable jaw portion 30 with one longitudinal series of teeth on the lower and adjacent bell crank lever. A connecting link 22 pivotally connected at opposite ends by means of pivot pins 20, 24 to the opposite ends of the rear bell crank 16 and front offset bell crank 26 transmits an operating force to the movable jaw 30. Said link 22 is adjacent one of said plates 14 and said rear bell crank 16 is adjacent the opposite of said plates 14.

In actual use, the tail of the rear bell crank 16 is raised to open the jaws 30, 32 at the opposite end of the device. A nut is then placed between the fixed jaw 32 and movable jaw 30, following which a downward movement upon the tail end of the rear bell crank lever 16 is operative to transmit a crushing force into the jaws 30, 32 thus crushing the nut therebetween. Since the base 12 is preferably of heavy material, such as cast iron, the device may be conveniently supported upon a table or other stationary object, so that both ends may be free to operate the mechanism. It is thus possible to crush all types of nuts in a simple and efficient manner.

While various changes may be made in the detail construction, it shall be understood that such changes shall be within the spirit and scope of the present invention as defined by the appended claim.

What I claim as new and desire to protect by Letters Patent of the United States is:

A nut cracker comprising, in combination, a horizontal rectangular shaped base having a pair of vertical, substantially identical, upright plates integrally secured thereto, each of said upright plates defining the outline of a dog and having a stationary head portion with flat side walls at the forward end thereof, each of said stationary flat side wall head portions having downwardly facing teeth thereof, said pair of head plates forming a stationary, fixed, rigid upper jaw with depending teeth at its side edges, a single movable jaw embodying a front horizontally offset bell crank lever having upwardly facing teeth at the forward end thereof, said movable jaw bell crank lever pivotally mounted between said rigid upright plates, said front horizontally offset bell crank lever having an intermediate portion and a depending rear end portion, said intermediate portion and said depending rear end portions each having a transverse bore therethrough, a pivot pin extending through said bore in said intermediate portion of said horizontally offset front bell crank for pivotally mounting said movable jaw between and beneath said stationary, fixed upper jaw, a movable handle embodying an offset rear bell crank lever arranged between said upright plates having an intermediate portion and a depending offset forward end portion and each of its portions thereof having a transverse bore therethrough, a second pivot pin extending through said bore in said intermediate portion of said offset rear bell crank lever for pivotally mounting said offset rear bell crank lever between said pair of upright plates at the rear end thereof, a straight longitudinal linkage bar having a single transverse bore extending through each of the forward and rear ends thereof, a third pivot pin extending through said bore in the forward end of said linkage bar and said bore in the depending rear end portion of said front offset bell crank lever, a fourth pivot pin extending through said bore in the rear end of said linkage bar and said bore in the depending forward offset end portion of said rear bell crank lever for pivotally connecting said movable jaw with said movable handle, and said linkage bar positioned longitudinally and adjacent one of said pair of plates transmitting force from said movable handle connected with said rear bell crank lever positioned longitudinally and adjacent the other of said plates to said movable jaw in response to pivotal movement of said movable handle.

References Cited in the file of this patent
UNITED STATES PATENTS

| | | |
|---|---|---|
| 660,033 | Sedgwick | Oct. 16, 1900 |
| 1,030,805 | Carlsen | June 25, 1912 |
| 1,123,852 | Costa | Jan. 5, 1915 |